(12) United States Patent
Kawano et al.

(10) Patent No.: US 12,084,250 B2
(45) Date of Patent: Sep. 10, 2024

(54) GENERATOR

(71) Applicant: HONDA MOTOR CO., LTD., Tokyo (JP)

(72) Inventors: Kohei Kawano, Wako (JP); Makoto Yamada, Wako (JP); Hiroki Iikura, Wako (JP); Keita Inamura, Wako (JP); Yoshihiro Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 17/952,977

(22) Filed: Sep. 26, 2022

(65) Prior Publication Data

US 2023/0102098 A1 Mar. 30, 2023

(30) Foreign Application Priority Data

Sep. 30, 2021 (JP) ................................. 2021-161102

(51) Int. Cl.
*B65D 77/22* (2006.01)

(52) U.S. Cl.
CPC ................................. *B65D 77/225* (2013.01)

(58) Field of Classification Search
CPC ....... F02B 63/04; F02M 37/20; B65D 77/225; Y02T 10/12
USPC ........................................................ 123/516
See application file for complete search history.

(56) References Cited

U.S. PATENT DOCUMENTS

| | | | |
|---|---|---|---|
| 2006/0185742 A1* | 8/2006 | Kakoo | F16K 31/20 137/587 |
| 2010/0212635 A1* | 8/2010 | Allen | F02M 35/10032 123/445 |

FOREIGN PATENT DOCUMENTS

WO 2020/049697 3/2020

* cited by examiner

*Primary Examiner* — Stephen J Castellano
(74) *Attorney, Agent, or Firm* — Rankin, Hill & Clark LLP

(57) ABSTRACT

In a generator including a fuel tank that stores liquid fuel, the fuel tank includes a fuel inlet and a breather passage formed by a pipe member through which an inside and outside of the fuel tank communicate with each other, and the pipe member is provided with a valve that blocks the breather passage at normal time and opens the breather passage by a pressure of a predetermined value or higher.

3 Claims, 8 Drawing Sheets

GENERATOR

INCORPORATION BY REFERENCE

The present application claims priority under 35 U.S.C. § 119 to Japanese Patent Application No. 2021-161102 filed on Sep. 30, 2021. The content of the application is incorporated herein by reference in its entirety.

BACKGROUND OF THE INVENTION

Field of the Invention

The present invention relates to a generator.

Description of the Related Art

Conventionally, there has been a generator capable of suppressing leakage of liquid fuel even when tilted in a predetermined direction. The generator includes a fuel tank provided with a tank bulge part which is a portion higher than a fuel inlet, and a breather passage through which an inside and outside of the fuel tank communicate with each other. The breather passage has an opening part at a position above the liquid fuel in the tank bulge part when the generator is tilted to right or left, inside the fuel tank (for example, see WO2020/049697).

However, by a conventional configuration, there is a risk that the liquid fuel enters the breather passage from the opening part when the fuel tank is tilted to the front or rear and the liquid fuel leaks out.

The present invention provides a generator capable of suppressing leakage of liquid fuel.

SUMMARY OF THE INVENTION

For an aspect of the present invention aspect, in a generator including a fuel tank that stores liquid fuel, the fuel tank includes a fuel inlet and a breather passage formed by a pipe member through which an inside and outside of the fuel tank communicate with each other, and the pipe member is provided with a valve that blocks the breather passage at normal time and opens the breather passage by a pressure of a predetermined value or higher.

According to the aspect of the present invention aspect, leakage of liquid fuel can be suppressed.

DETAILED DESCRIPTION OF THE PREFERRED EMBODIMENT

Figure 1:
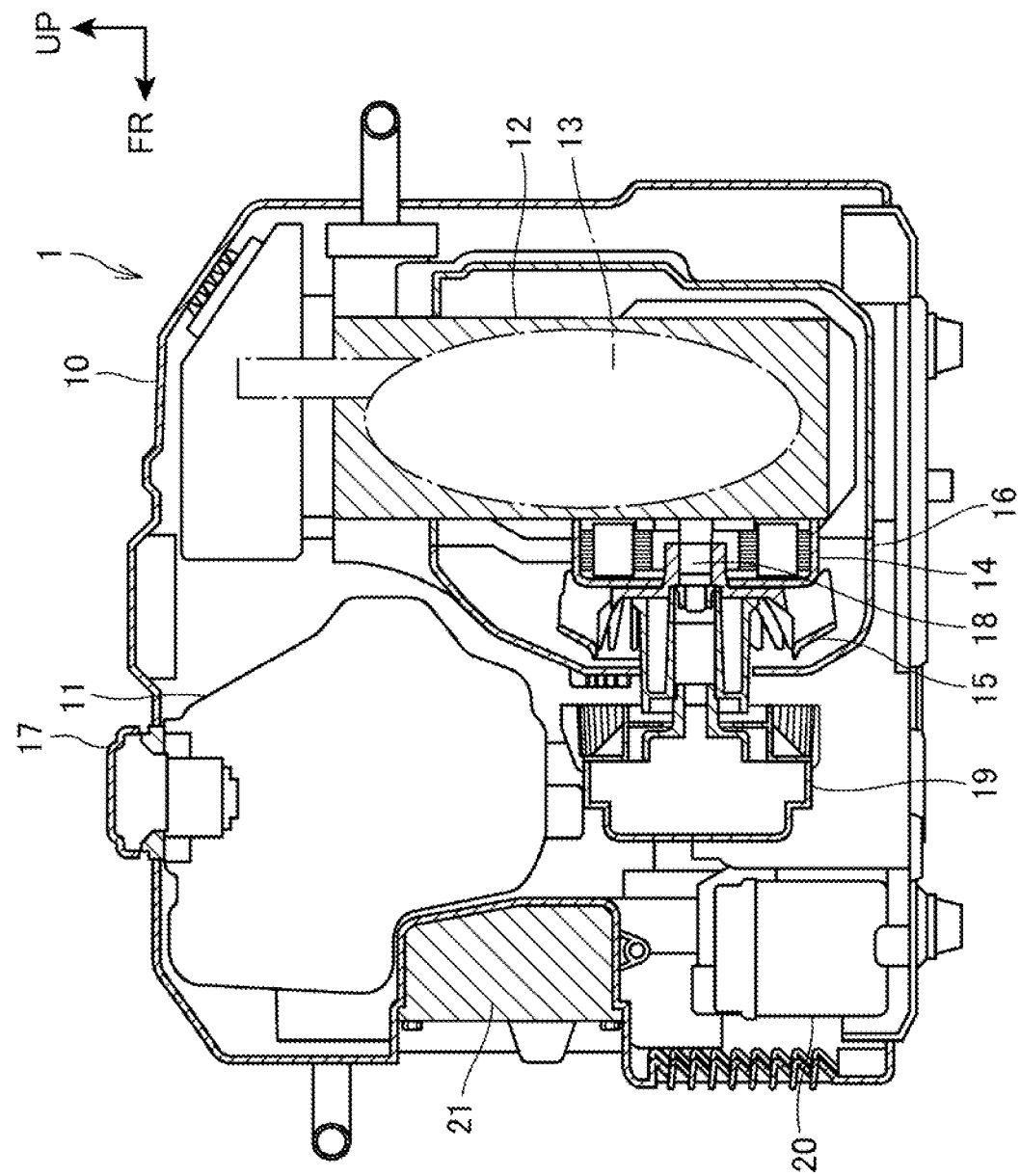
FIG. 1 is a configuration view of a generator according to a present embodiment.

FIG. 1 is a configuration view of a generator 1.

The generator 1 includes an outer casing 10. Inside the outer casing 10, a fuel tank 11, an engine 12, a muffler 13, an alternator 14, a fan 15, and a shroud 16 are disposed.

The fuel tank 11 includes a fuel inlet that can be accessed from an outside, and liquid fuel can be put into the fuel tank 11 through the fuel inlet. A fuel inlet cap 17 is removably mounted on the fuel inlet.

The engine 12 is an ignition air-cooled engine driven by the liquid fuel inside the fuel tank 11. The engine 12 includes a cylinder, a piston that reciprocates inside the cylinder, and a crankshaft 18 that is coupled to the piston through a connecting rod.

An intake pipe connected to the engine 12 is provided with a throttle valve and a fuel supply device. Air of which the volume is adjusted by the throttle valve and the fuel supplied from the fuel supply device are mixed, and this air-fuel mixture is supplied to the engine 12. The engine 12 combusts the air-fuel mixture in a combustion chamber to drive the piston and thereby rotates the crankshaft 18 through the connecting rod.

The muffler 13 is connected to an outlet of an exhaust pipe connected to the engine 12. The muffler 13 serves purposes such as reducing an exhaust sound level.

The fuel to drive the engine 12 may be gasoline or may be liquid fuel other than gasoline. The fuel supply device may have a configuration using an injector or a configuration using a carburetor.

The generator 1 includes a control unit. The control unit has a processor such as a CPU (Central Processing Unit), and a memory such as a ROM (Read Only Memory). The control unit controls individual parts of the generator 1 as the processor executes programs stored in the memory. The control unit functions as, for example, an ECU (Electronic Control Unit) that outputs control signals for controlling output of the engine 12.

The alternator 14 is mounted to the crankshaft 18 of the engine 12. The alternator 14 is a multipolar alternator that is driven by the engine 12 to generate alternating-current power. The alternator 14 has a rotor that rotates integrally with the crankshaft 18, and a stator that is disposed concentrically with the rotor so as to face a circumferential surface of the rotor.

The rotor is provided with a permanent magnet. The stator is provided with U-phase, V-phase, and W-phase windings that are disposed at a phase angle of, for example, 120 degrees to one another.

The fan 15 is mounted on the crankshaft 18. On the crankshaft 18, a starting device 19 for starting the engine 12 is disposed. When the engine 12 is driven, power is generated by the alternator 14. When the engine 12 is driven, the fan 15 rotates, sending cooling air to the engine 12. The alternator 14 generates alternating-current power.

The shroud 16 includes a ventilation opening through which air is taken in. The shroud 16 guides the air sent by the fan 15 to the periphery of the engine 12 by covering the alternator 14 and the fan 15.

The outer casing 10 includes an intake port through which outside air is taken in and an exhaust port through which air having cooled the engine 12 is discharged.

The generator 1 includes an inverter 20. The inverter 20 controls a voltage and a frequency of the alternating-current power generated by the alternator 14 so as to stabilize the output.

The generator 1 further includes a control panel 21. The control panel 21 is provided with an electrical outlet, operating switches, and others.

The electrical outlet is supplied with alternating-current power from the inverter 20. A plug of a device that uses generated power is connected to the electrical outlet. Alternatively, the electrical outlet may be supplied with direct-current power.

In FIG. 1, for a direction in a state where the generator 1 is installed for use, an upper part is denoted by a sign UP and a front is denoted by FR. Hereinafter, the state where the generator 1 is installed for use is referred to as an installed state.

Figure 2:
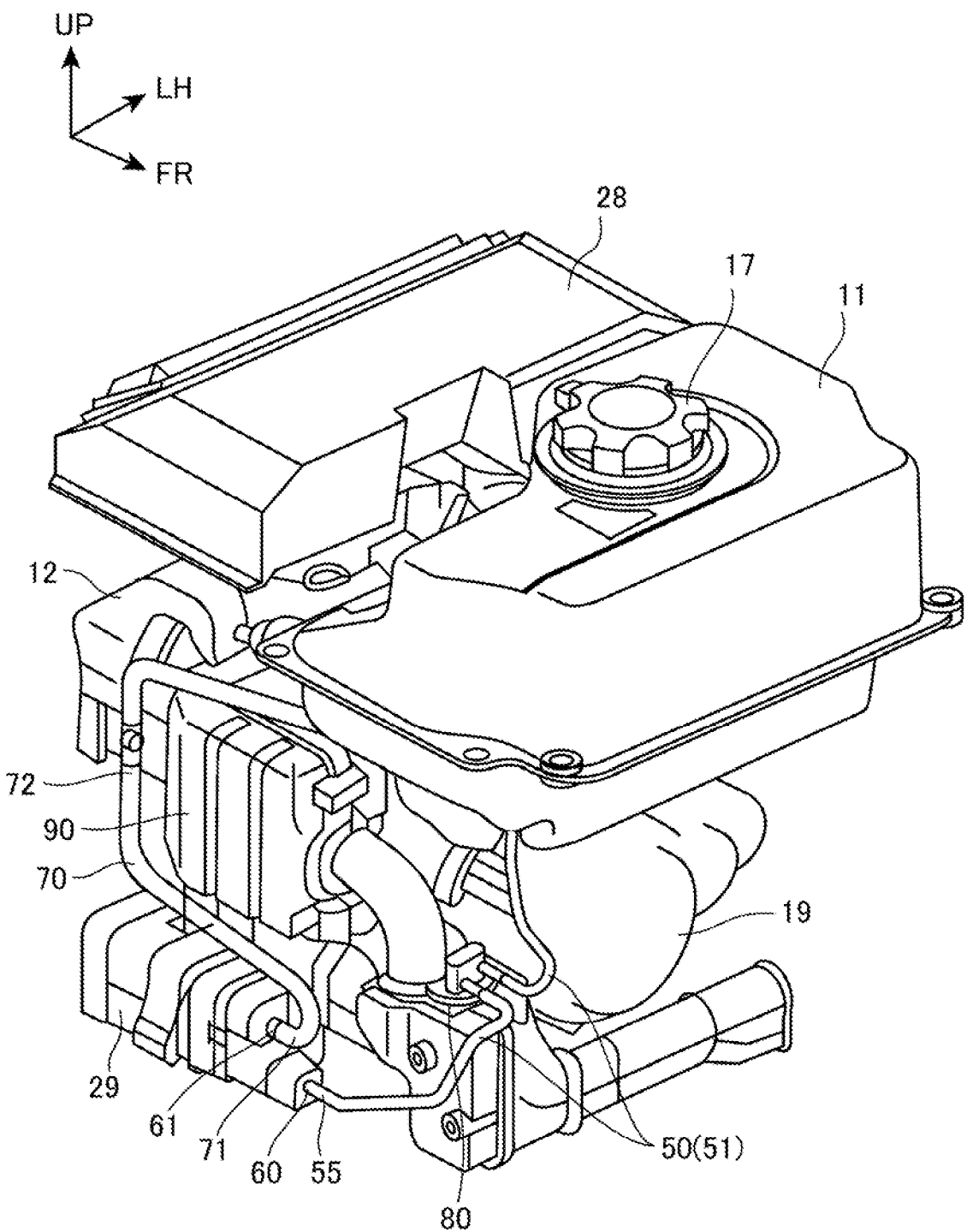
FIG. 2 is a perspective view illustrating an internal configuration of the generator.

FIG. 2 is a perspective view illustrating an internal configuration of the generator 1. In FIG. 2 and the following drawings, UP denotes the upper part, FR denotes the front and LH denotes a left part. The directions denoted by the signs coincide with the directions of the generator 1 illustrated in FIG. 1.

As illustrated in FIG. 2, an exhaust box 28 is provided above the engine 12. To the exhaust box 28, the muffler 13 is connected.

On a side part of the engine 12, an air cleaner case 90 is disposed. In the present embodiment, the air cleaner case 90 is disposed on an opposite side of the muffler 13 across the engine 12.

The fuel tank 11 is provided with a pipe member 50. The pipe member 50 is a tubular member provided with openings on both ends, through which an internal space S1 of the fuel tank 11 and an outside of the fuel tank 11 communicate with each other. An inner part of the pipe member 50 functions as a breather passage 51 through which evaporated fuel that is made gaseous by vaporization in the internal space S1 is made to flow and discharged to the outside of the fuel tank 11.

By discharging the evaporated fuel to the outside of the fuel tank 11 through the breather passage 51, in the generator 1, the situation that a pressure in the fuel tank 11 fluctuates due to a change of an outside air temperature and consumption of the liquid fuel or the like can be suppressed. Therefore, in the generator 1, the fuel can be appropriately supplied to the engine 12, and strength and pressure resistance of fuel system parts demanded for the fuel tank 11 are lowered.

On the side part of the engine 12, a canister 29 is provided. In the present embodiment, the canister 29 is disposed below the air cleaner case 90. The canister 29 recovers the evaporated fuel by adsorbing the evaporated fuel vaporized in the internal space S1 of the fuel tank 11 to an adsorbent such as activated carbon and accumulating the evaporated fuel. By being provided with the canister 29, the generator 1 can easily cope with a regulation value when a gas discharge amount including the evaporated fuel is regulated.

One end 53 of the pipe member 50 is disposed in the internal space S1 (FIG. 3) of the fuel tank 11 and the other end 55 of the pipe member 50 is connected to a first connection port 60 provided on the canister 29.

Further, the canister 29 is provided with a second connection port 61 and one end 71 of a supply pipe 70 which is a tubular member is connected to the second connection port 61. The other end 72 of the supply pipe 70 is connected to the air cleaner case 90.

The evaporated fuel adsorbed by the canister 29 is desorbed from the canister 29 while the engine 12 is stopped, and is supplied to the air cleaner case 90 through the supply pipe 70.

The pipe member 50 is provided with a low sealing valve 80. The low sealing valve 80 is provided on a part positioned between the one end 53 and the other end 55 of the pipe member 50 outside the fuel tank 11.

The low sealing valve 80 is a valve body that blocks the breather passage 51 at normal time and opens the breather passage 51 when the pressure of the predetermined value or higher is applied through the breather passage 51. In the present embodiment, when a predetermined amount or more of the evaporated fuel is generated and the evaporated fuel that has flown into the breather passage 51 pressurizes the low sealing valve 80 by a pressure exceeding a valve opening pressure of the low sealing valve 80, the low sealing valve 80 opens the breather passage 51 and the evaporated fuel flows into the canister 29.

In such a manner, since the pipe member 50 is provided with the low sealing valve 80, even in a case where the liquid fuel flows into the breather passage 51 due to turnover or tilting or the like of the generator 1 for example, when the pressure does not exceed the valve opening pressure of the low sealing valve 80 (normal time), the breather passage 51 is blocked by the low sealing valve 80 so that the liquid fuel is suppressed from flowing into the canister 29.

For the low sealing valve 80, a valve to be in a closed state at normal time and to be in an open state when the valve opening pressure of the predetermined value or higher is applied, such as a diaphragm valve, is suitably used.

Next, a structure of the fuel tank 11 will be explained further.

Figure 3:
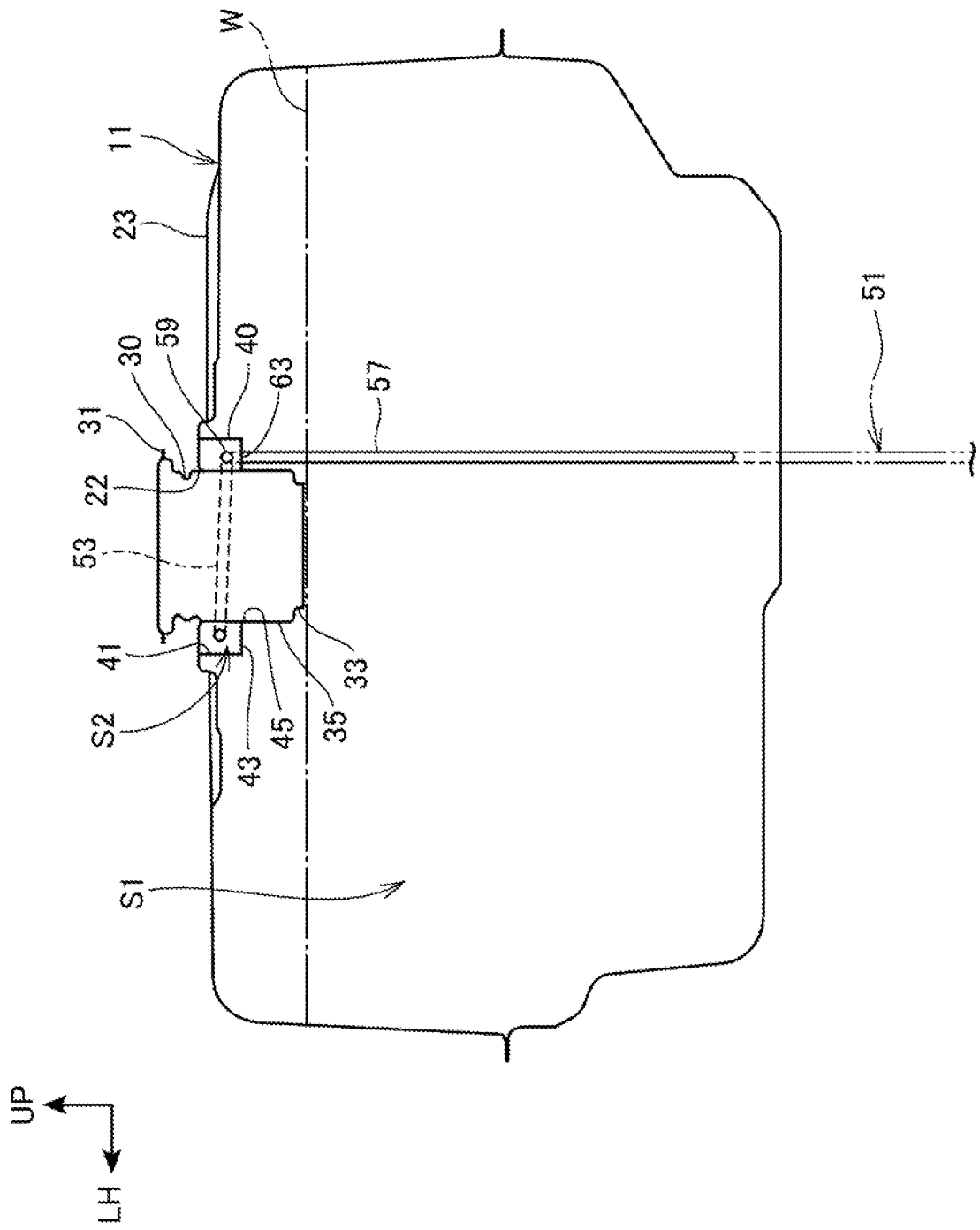
FIG. 3 is a vertical sectional view of a fuel tank.

FIG. 3 is a vertical sectional view of the fuel tank 11. In FIG. 3, a liquid surface of the liquid fuel when the liquid fuel for an amount to reach a lower end 33 of a fuel supply pipe 30 is supplied to the internal space S1 is illustrated by a virtual line W.

As illustrated in FIG. 3, the fuel tank 11 has the internal space S1 capable of storing the liquid fuel inside.

As illustrated in FIG. 3, an opening 22 is provided on a top surface 23 of the fuel tank 11, and the fuel supply pipe 30 which is a cylindrical member is inserted to the opening 22. An upper end 31 of the fuel supply pipe 30 is projected to the outside of the fuel tank 11 and an opening at the upper end 31 of the fuel supply pipe 30 functions as the fuel inlet.

The lower end 33 of the fuel supply pipe 30 extends toward a bottom part of the fuel tank 11 with a predetermined width dimension inside the fuel tank 11.

In the present embodiment, when the amount assumed to be an upper limit of the liquid fuel that can be supplied to the generator 1, that is a regulated amount, of the liquid fuel is supplied to the fuel tank 11, the liquid surface of the liquid fuel stored in the internal space S1 is positioned below the lower end 33 of the fuel supply pipe 30.

FIG. 3 is a vertical sectional view illustrating a breather chamber S2. In FIG. 3, the liquid surface of the liquid fuel when the liquid fuel for the amount to reach the lower end 33 of the fuel supply pipe 30 is supplied to the internal space S1 is illustrated by the virtual line W.

As illustrated in FIG. 3, a separator 40 is provided inside the fuel tank 11. The separator 40 is a cylindrical member surrounding an outer peripheral surface 35 of the fuel supply pipe 30. An upper end 41 of the separator 40 is coupled to the top surface 23 of the fuel tank 11, and a lower end side of the separator 40 is bent toward the fuel supply pipe 30 over an entire periphery. On the lower end side of the separator 40, the part bent toward the fuel supply pipe 30 forms a bottom surface 43 of the separator 40. A lower end 45 of the separator 40 is coupled to the outer peripheral surface 35 of the fuel supply pipe 30.

The lower end 33 of the fuel supply pipe 30 is positioned below the bottom surface 43. That is, the lower end 33 is projected toward the lower part of the fuel tank 11 with the predetermined width dimension from the bottom surface 43 of the separator 40.

In the fuel tank 11, the breather chamber S2 surrounded by the separator 40, the outer peripheral surface 35 of the fuel supply pipe 30 and the top surface 23 of the fuel tank 11 is formed. The breather chamber S2 is isolated from the internal space S1 by the separator 40.

Figure 4:
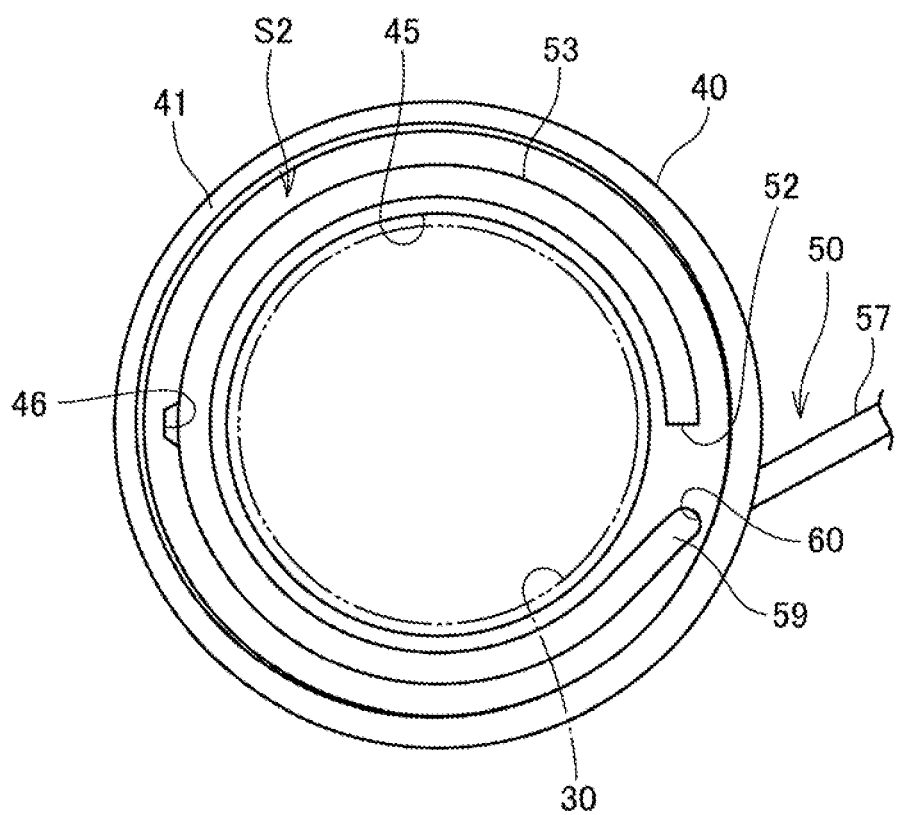
FIG. 4 is a plan view viewing a separator from above.

FIG. 4 is a plan view viewing the separator 40 from above.

On the bottom surface 43 of the separator 40, an air vent 46 is provided. The internal space S1 and the breather chamber S2 communicate with each other through the air vent 46.

As described above, when the regulated amount of the liquid fuel is supplied to the generator 1, the liquid surface of the liquid fuel stored in the internal space S1 is positioned below the lower end 33 of the fuel supply pipe 30.

When the regulated amount or more of the fuel is supplied to the fuel tank 11, the lower end 33 is blocked by the liquid surface of the liquid fuel stored in the internal space S1. Accordingly, when the liquid fuel is supplied further into the fuel tank 11, air in the internal space S1 of the fuel tank 11 and the liquid fuel supplied to the fuel tank 11 are not replaced, and the liquid fuel is stored inside the fuel supply pipe 30 without flowing into the internal space S1. That is, in the generator 1 in the installed state, the liquid surface of the liquid fuel in the internal space S1 is suppressed from being positioned above the virtual line W illustrated in FIG. 3.

Further, in the generator 1, since the liquid fuel is stored inside the fuel supply pipe 30 without flowing into the internal space S1, it can be indicated to a user who supplies the liquid fuel that the regulated amount or more of the liquid fuel has been supplied to the fuel tank 11.

As described above, the lower end 33 of the fuel supply pipe 30 is projected toward the lower part of the fuel tank 11 with the predetermined width dimension from the bottom surface 43 of the separator 40. That is, the bottom surface 43 of the separator 40 is positioned above the lower end 33. Further, the bottom surface 43 of the separator 40 is provided so as to be positioned above the liquid surface even when the liquid surface of the liquid fuel is elevated by a temperature rise or the like in the state where the regulated amount of the fuel has been supplied.

Thus, in the generator 1 in the installed state, the liquid surface of the liquid fuel in the internal space S1 is suppressed from reaching the bottom surface 43. Therefore, in the generator 1 in the installed state, the liquid fuel is suppressed from flowing from the air vent 46 to the breather chamber S2, and in the fuel tank 11, the liquid fuel is suppressed from flowing from the internal space S1 to the breather chamber S2 of the separator 40.

As illustrated in FIG. 3, the pipe member 50 is inserted to a continuous hole 27 provided on a side face 25 of the fuel tank 11 and is thus partially disposed in the internal space S1. The pipe member 50 disposed in the internal space S1 is routed toward the separator 40, and is inserted to an insertion hole 63 provided on the bottom surface 43 of the separator 40. Then, the one end 53 of the pipe member 50 is housed in the breather chamber S2. The pipe member 50 inserted to the insertion hole 63 is disposed so as to extend straight along a longitudinal direction of the fuel supply pipe 30 before and after being inserted to the insertion hole 63. Hereinafter, the part of the pipe member 50 disposed so as to extend straight is referred to as a straight part 57.

As illustrated in FIG. 3 and FIG. 4, the end 53 housed in the breather chamber S2 is bent from the straight part 57 and is annularly bent so as to surround the outer peripheral surface 35 of the fuel supply pipe 30. Hereinafter, the part of the pipe member 50 bent from the straight part 57 is referred to as a bent part 59.

In the present embodiment, the end 53 is wound around the fuel supply pipe 30 so as to circle just around the outer peripheral surface 35 of the fuel supply pipe 30. Thus, an open end 52 which is one distal end of the pipe member 50 is disposed adjacently to the straight part 57 and the bent part 59 which is a start position of the end 53 annularly bent surrounding the outer peripheral surface 35 of the fuel supply pipe 30. The open end 52 functions as an entrance of the breather passage 51.

As illustrated in FIG. 4, the open end 52 is disposed so as to be positioned on the opposite side across the fuel supply pipe 30 in the plan view of the fuel tank 11.

Next, flow of the evaporated fuel in the generator 1 will be explained.

In the generator 1 in the installed state, the liquid fuel stored in the internal space S1 of the fuel tank 11 is sometimes vaporized and turned to gaseous evaporated fuel. The evaporated fuel flows from the internal space S1 to the breather chamber S2 through the air vent 46.

The evaporated fuel that has reached the breather chamber S2 flows into the breather passage 51 from the open end 52 of the pipe member 50, and is discharged to the outside of the fuel tank 11 through the breather passage 51.

As described above, in the generator 1 in the installed state, the liquid surface of the liquid fuel in the internal space S1 is suppressed from reaching the bottom surface 43. Accordingly, the air vent 46 is suppressed from being blocked by the liquid fuel supplied to the internal space S1, and obstruction of discharge of the evaporated fuel from the internal space S1 of the fuel tank 11 is suppressed.

When the generator 1 is used, there is a risk that the generator 1 is tiled or turned over in a front, rear, left or right direction from the installed state. In such a case, there is a risk that the liquid fuel supplied to the internal space S1 flows into the breather passage 51 similarly to the evaporated fuel and leaks to the outside of the fuel tank 11 through the breather passage 51.

In the present embodiment, the breather chamber S2 where the one end 53 of the pipe member 50 is disposed is provided. The breather chamber S2 is isolated from the internal space S1 of the fuel tank 11 by the separator 40.

Accordingly, in the generator 1, even when the generator 1 is tilted or turned over in one of the front, rear, left and right directions from the installed state, the liquid fuel is suppressed from reaching the open end 52. Therefore, in the generator 1, the liquid fuel supplied to the internal space S1 is suppressed from leaking to the outside of the fuel tank 11.

Further, the breather chamber S2 is formed by being surrounded by the separator 40, the outer peripheral surface 35 of the fuel supply pipe 30 and the top surface 23 of the fuel tank 11.

Accordingly, the breather chamber S2 separated and isolated from the liquid surface of the liquid fuel can be formed without providing such a shape that the top surface 23 of the fuel tank 11 is deformed and separated from the liquid surface of the liquid fuel housed in the fuel tank 11 for example. Therefore, in the generator 1, complication of the structure of the fuel tank 11 and decline of design of the fuel tank 11 and the generator 1 can be suppressed.

Figure 5A:
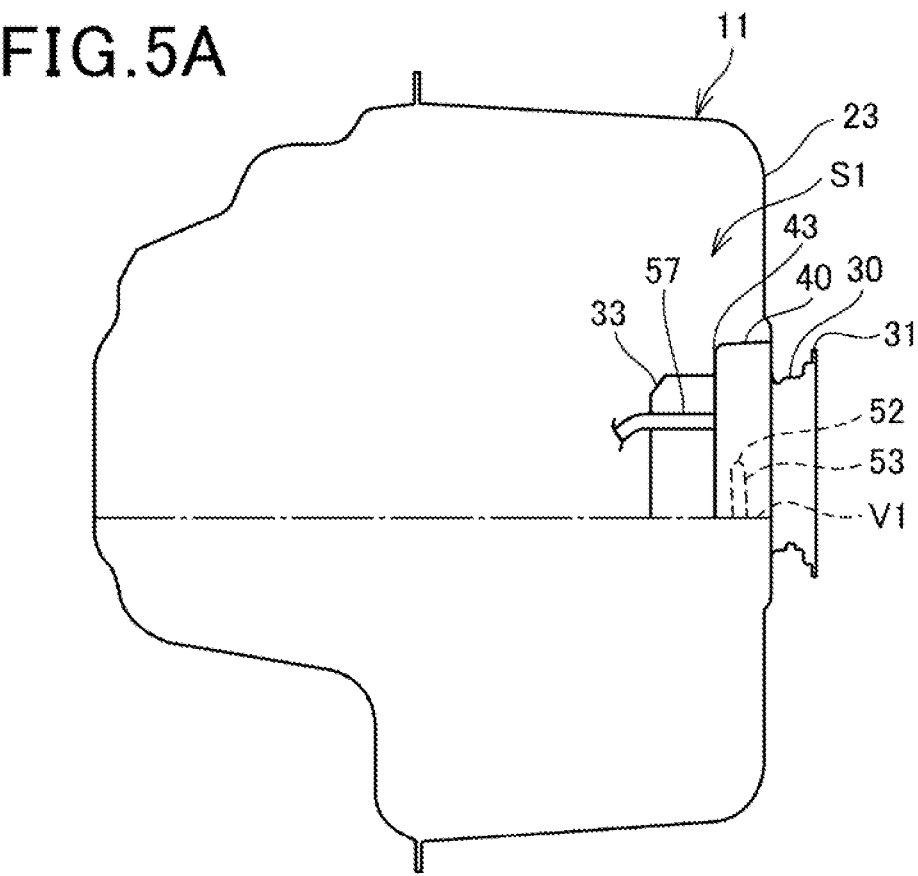
FIGS. 5A and 5B are drawings illustrating an inside of the fuel tank when the generator is turned over to a front side.
Figure 5B:
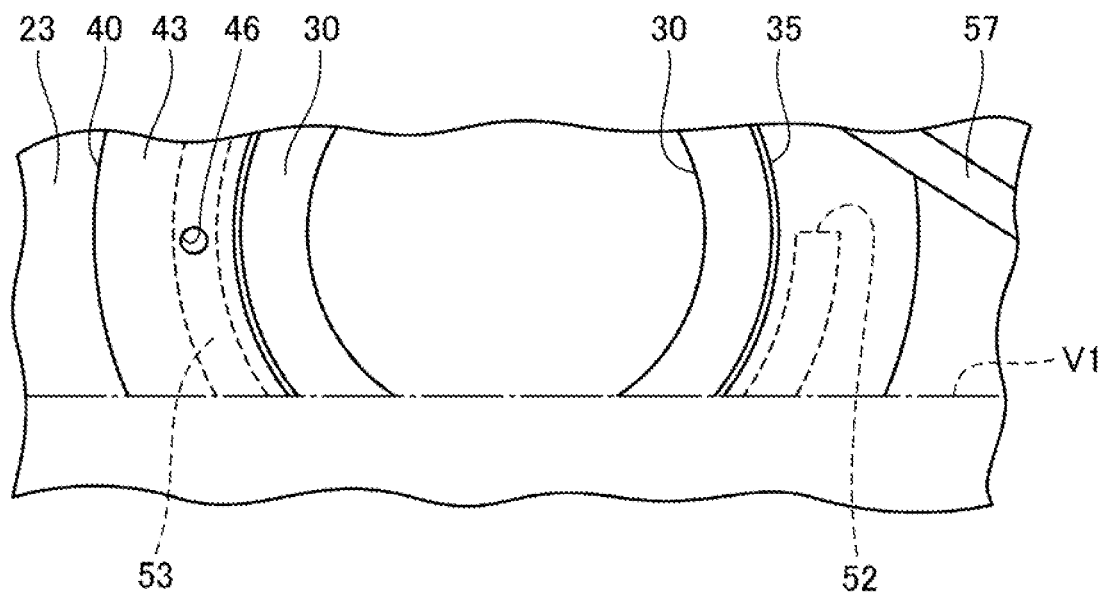
Figure 6A:
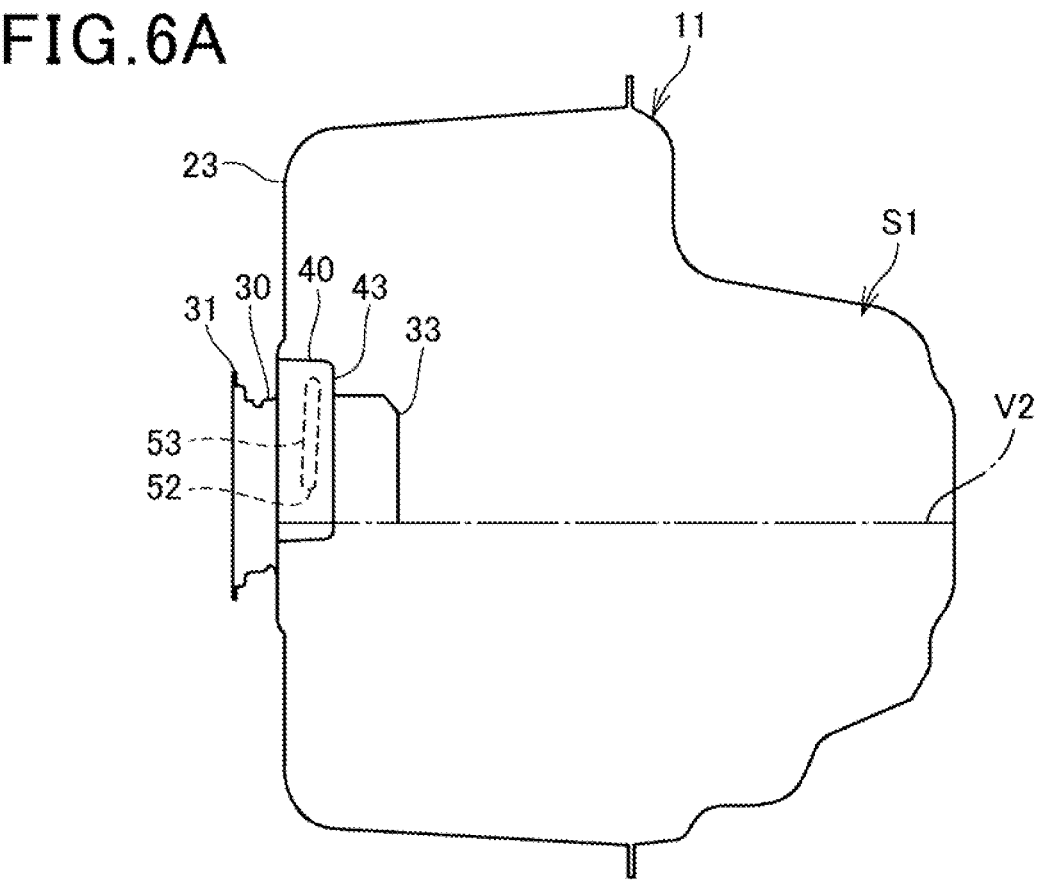
FIGS. 6A and 6B are drawings illustrating the inside of the fuel tank when the generator is turned over to a rear side.
Figure 6B:
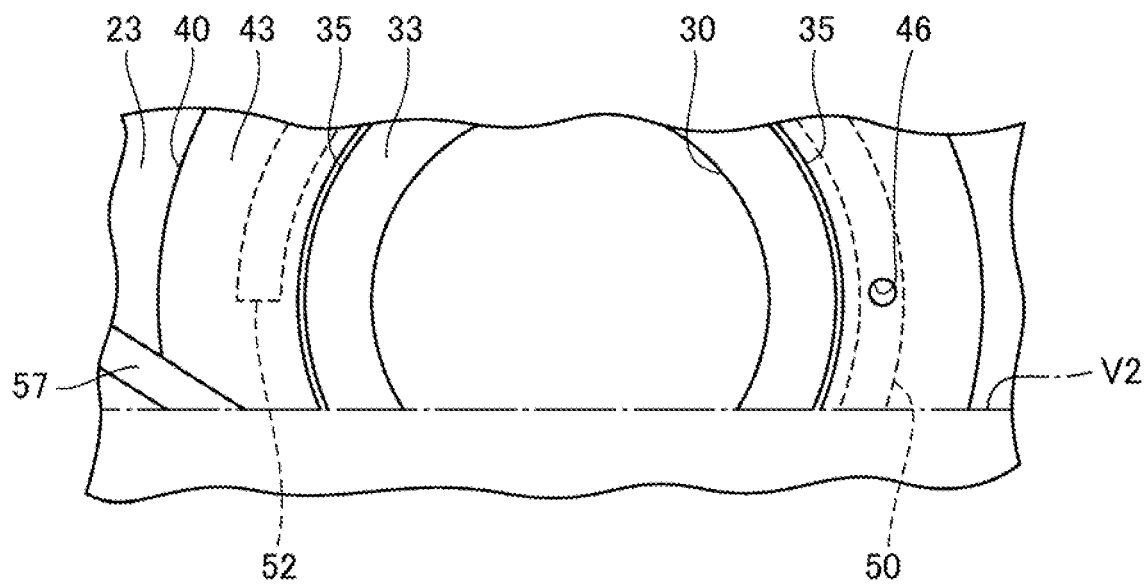
Figure 7A:
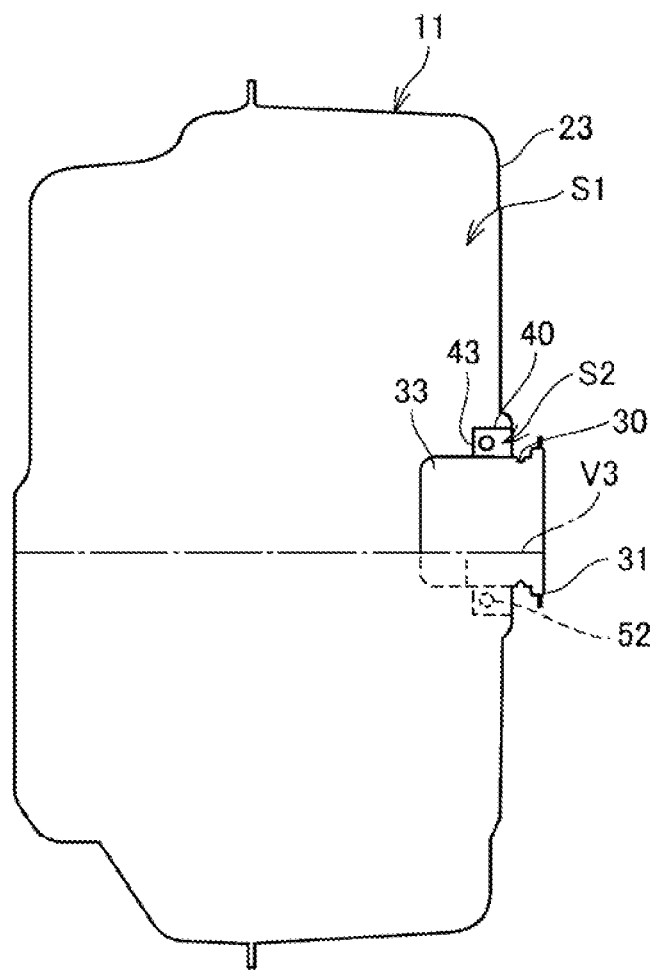
FIGS. 7A and 7B are drawings illustrating the inside of the fuel tank when the generator is turned over to a right side.
Figure 7B:
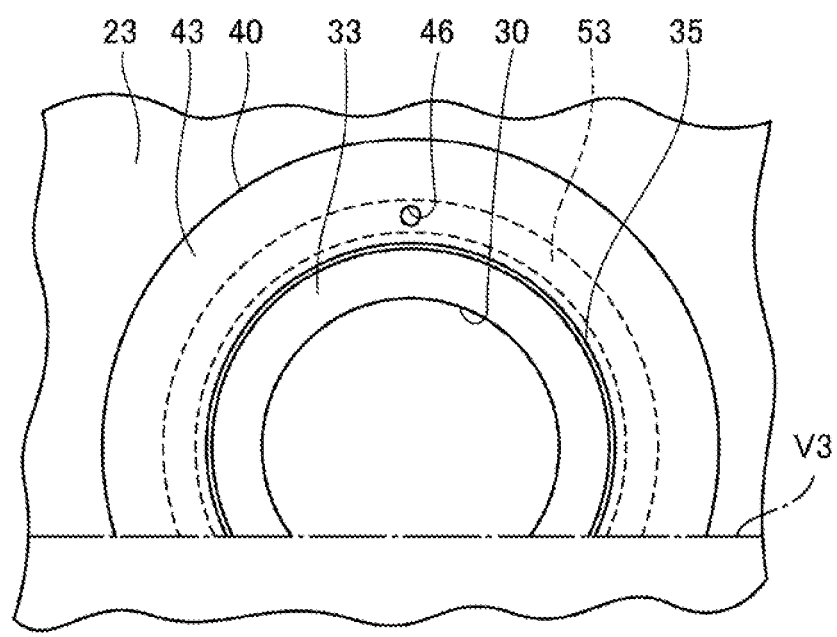
Figure 8A:
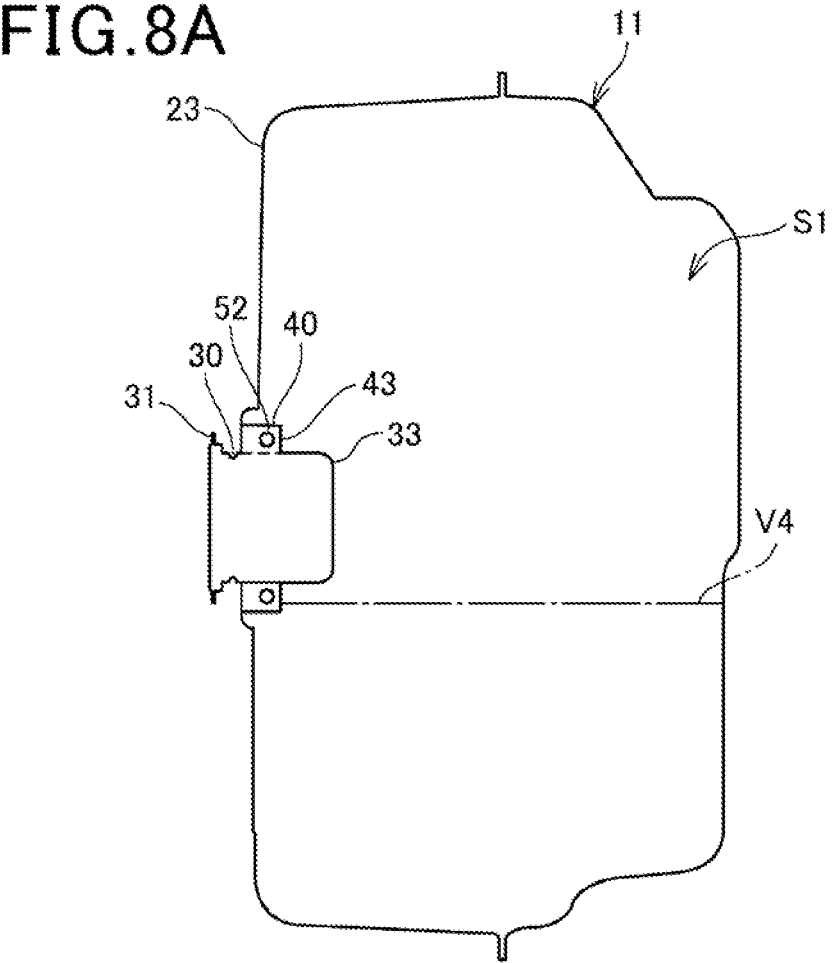
FIGS. 8A and 8B are drawings illustrating the inside of the fuel tank when the generator is turned over to a left side.
Figure 8B:
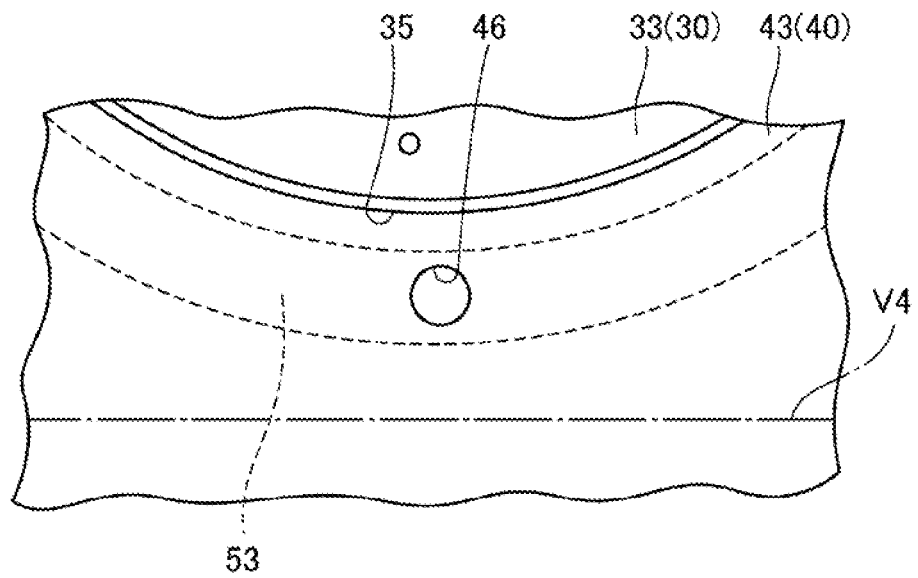

FIGS. 5A and 5B are drawings illustrating the inside of the fuel tank 11 when the generator 1 is turned over to a front side. FIGS. 6A and 6B are drawings illustrating the inside of the fuel tank 11 when the generator 1 is turned over to a rear side. FIGS. 7A and 7B are drawings illustrating the inside of the fuel tank 11 when the generator 1 is turned over to a right side. FIGS. 8A and 8B are drawings illustrating the inside of the fuel tank 11 when the generator 1 is turned over to a left side. FIGS. 5A, 6A, 7A and 8A are all vertical sectional views of the fuel tank 11. FIGS. 5B, 6B, 7B and 8B are all drawings viewing the lower end 33 of the fuel supply pipe 30 and the bottom surface 43 of the separator 40 from a bottom surface side of the fuel tank 11.

Here, the state of the inside of the fuel tank 11 when the generator 1 is turned over will be explained.

For example, in the case where the liquid fuel for half the amount of the regulated amount is supplied to the internal space S1 of the fuel tank 11, when the generator 1 is turned over to the front side, the liquid surface of the liquid fuel inside the fuel tank 11 is at the position illustrated by a virtual line V1 in FIGS. 5A and 5B.

In the state, both of the air vent 46 and the open end 52 are positioned above the virtual line V1, that is above the liquid surface of the liquid fuel. Therefore, the liquid fuel is suppressed from entering the breather passage 51 and flowing out to the outside of the fuel tank 11.

In the case where the liquid fuel for half the amount of the regulated amount is supplied to the internal space S1 of the fuel tank 11, when the generator 1 is turned over to the rear side, the liquid surface of the liquid fuel inside the fuel tank 11 is at the position illustrated by a virtual line V2 in FIGS. 6A and 6B.

In the state, both of the air vent 46 and the open end 52 are positioned above the liquid surface of the liquid fuel. Therefore, the liquid fuel is suppressed from entering the breather passage 51 and flowing out to the outside of the fuel tank 11.

In the case where the liquid fuel for half the amount of the regulated amount is supplied to the internal space S1 of the fuel tank 11, when the generator 1 is turned over to the right side, the liquid surface of the liquid fuel inside the fuel tank 11 is at the position illustrated by a virtual line V3 in FIGS. 7A and 7B.

In the state, the open end 52 is positioned below the virtual line V3, that is below the liquid surface of the liquid fuel. On the other hand, the air vent 46 is positioned above the liquid surface of the liquid fuel. Therefore, the liquid fuel is suppressed from entering the breather passage 51 and flowing out to the outside of the fuel tank 11.

In the case where the liquid fuel for half the amount of the regulated amount is supplied to the internal space S1 of the fuel tank 11, when the generator 1 is turned over to the left side, the liquid surface of the liquid fuel inside the fuel tank 11 is at the position illustrated by a virtual line V4 in FIGS. 8A and 8B.

In the state, both of the air vent 46 and the open end 52 are positioned above the liquid surface of the liquid fuel. Therefore, the liquid fuel is suppressed from entering the breather passage 51 and flowing out to the outside of the fuel tank 11.

In this way, in the generator 1, the breather chamber S2 is provided so as to surround the fuel supply pipe 30, and the open end 52 of the pipe member 50 and the air vent 46 through which the internal space S1 and the breather chamber S2 communicate with each other are provided on the positions that do not overlap in the plan view of the fuel tank 11. Accordingly, even when the generator 1 is tilted or turned over in one of the front, rear, left and right directions from the installed state, in the generator 1, the liquid fuel is suppressed from entering the breather passage 51 and flowing out to the outside of the fuel tank 11.

As described above, according to the present embodiment, the fuel tank 11 includes the fuel inlet and the breather passage 51 formed by the pipe member 50 through which the inside and outside of the fuel tank 11 communicate with each other. Then, the pipe member 50 is provided with the low sealing valve 80 that blocks the breather passage 51 at normal time and opens the breather passage 51 by the pressure of the predetermined value or higher.

Accordingly, even when the liquid fuel flows into the breather passage 51 due to the turnover or tilting or the like of the generator 1, since the breather passage 51 is blocked by the low sealing valve 80, the liquid fuel is suppressed from flowing into the canister 29. Therefore, in the generator 1, the liquid fuel can be suppressed from entering the breather passage 51 and flowing out to the outside of the fuel tank 11.

In addition, according to the present embodiment, the separator 40 that forms the breather chamber S2 isolated from the internal space S1 of the fuel tank 11 is provided inside the fuel tank 11, and the one end 53 of the pipe member 50 is disposed inside the breather chamber S2.

Accordingly, the one end 53 of the pipe member 50 is isolated from the internal space S1 of the fuel tank 11. Therefore, in the generator 1, even when the generator 1 is tilted or turned over in one of the front, rear, left and right directions from the installed state, the liquid fuel is suppressed from reaching the open end 52, and the liquid fuel supplied to the internal space S1 is suppressed from leaking to the outside of the fuel tank 11.

Further, according to the present embodiment, the separator 40 is provided with the air vent 46 through which the internal space S1 of the fuel tank 11 and the breather chamber S2 communicate with each other.

Accordingly, the evaporated fuel for which the liquid fuel stored in the internal space S1 of the fuel tank 11 is vaporized flows into the breather passage 51 through the air vent 46, and is discharged to the outside of the fuel tank 11 through the breather passage 51. Therefore, the situation that the pressure in the fuel tank 11 fluctuates due to the change of the outside air temperature and the consumption of the liquid fuel or the like is suppressed.

In addition, according to the present embodiment, at least one of the air vent 46 and the open end 52 is provided on the part positioned above the liquid surface of the liquid fuel when the generator 1 is turned over in the state where the fuel tank 11 has the liquid fuel for half the amount of a capacity of the fuel tank 11.

Accordingly, even when the generator 1 is tilted or turned over in one of the front, rear, left and right directions from the installed state, the liquid fuel is suppressed from entering the air vent 46 or the open end 52. Therefore, in the generator 1, the liquid fuel is suppressed from entering the breather passage 51 and flowing out to the outside of the fuel tank 11.

Further, according to the present embodiment, the fuel tank 11 is provided with the fuel supply pipe 30 that is coupled to the fuel inlet and extends toward the internal space S1 of the fuel tank 11, and the fuel inlet is provided on the top surface 23 of the fuel tank 11. Then, the breather chamber S2 is provided by being surrounded by the separator 40, the fuel supply pipe 30 and the top surface 23 of the fuel tank 11.

Accordingly, the breather chamber S2 isolated from the liquid surface of the liquid fuel can be formed without providing such a form that the fuel tank 11 is deformed and separated from the liquid surface of the liquid fuel housed in the fuel tank 11. Therefore, in the generator 1, the complication of the structure of the fuel tank 11 and the decline of the design of the fuel tank 11 and the generator 1 can be suppressed.

The embodiment described above exemplifies one aspect of the present invention, and arbitrary modifications and applications are possible without deviating from the gist of the present invention.

In the embodiment described above, the canister 29 is disposed inside the generator 1. However, without being limited to that, for example, in the case of an area where the regulation value of the gas discharge amount including the evaporated fuel is not so strict or the like, the pipe member 50 may be directly connected to the air cleaner case 90. In addition, for example, the pipe member 50 may be open to space outside the fuel tank 11.

[Configurations Supported by Embodiment Described Above]

The embodiment described above supports the following configurations.

(Configuration 1) A generator including a fuel tank that stores liquid fuel, wherein the fuel tank includes a fuel inlet and a breather passage formed by a pipe member through which an inside and outside of the fuel tank communicate with each other, and the pipe member is provided with a valve that blocks the breather passage at normal time and opens the breather passage by a pressure of a predetermined value or higher.

According to the configuration, even when the liquid fuel flows into the breather passage due to the turnover or tilting or the like of the generator, since the breather passage is blocked by the valve, the liquid fuel is suppressed from flowing into the canister. Therefore, in the generator, the liquid fuel is suppressed from entering the breather passage and flowing out to the outside of the fuel tank.

(Configuration 2) The generator according to configuration 1, wherein a separator that forms a breather chamber isolated from an internal space of the fuel tank is provided inside the fuel tank, and one end of the pipe member is disposed inside the breather chamber.

According to the configuration, the one end of the pipe member is isolated from the internal space of the fuel tank. Therefore, in the generator, even when the generator is tilted or turned over in one of the front, rear, left and right directions from the installed state, the liquid fuel is suppressed from reaching the opening of the pipe member, and the liquid fuel supplied to the internal space is suppressed from leaking to the outside of the fuel tank.

(Configuration 3) The generator according to configuration 2, wherein the separator is provided with an air vent through which the internal space of the fuel tank and the breather chamber communicate with each other.

According to the configuration, the evaporated fuel for which the liquid fuel stored in the internal space of the fuel tank is vaporized flows into the breather passage through the air vent, and is discharged to the outside of the fuel tank through the breather passage. Therefore, the situation that the pressure in the fuel tank fluctuates due to the change of the outside air temperature and the consumption of the liquid fuel or the like is suppressed.

(Configuration 4) The generator according to configuration 3, wherein an opening is provided on one end of the pipe member and at least one of the air vent and the opening is provided on a part positioned above a liquid surface of the liquid fuel when the generator is turned over in a state where the fuel tank has the liquid fuel for half the amount of a capacity of the fuel tank.

According to the configuration, even when the generator is tilted or turned over in one of the front, rear, left and right directions from the installed state, the liquid fuel is suppressed from entering the air vent or the open end. Therefore, in the generator, the liquid fuel is suppressed from entering the breather passage and flowing out to the outside of the fuel tank.

(Configuration 5) The generator according to any one of configuration 2 to configuration 4, wherein the fuel tank is provided with a cylindrical member that is coupled to the fuel inlet and extends toward the internal space of the fuel tank, the fuel inlet is provided on a top surface of the fuel tank, and the breather chamber is provided by being surrounded by the separator, the cylindrical member and the top surface of the fuel tank.

According to the configuration, the breather chamber isolated from the liquid surface of the liquid fuel can be formed without forming such a shape that the fuel tank is deformed and separated from the liquid surface of the liquid fuel housed in the fuel tank. Therefore, in the generator 1, the complication of the structure of the fuel tank and the decline of the design of the fuel tank and the generator can be suppressed.

REFERENCE SIGNS LIST 1 generator
11 fuel tank
12 engine
22 opening
23 top surface
25 side face
27 continuous hole
29 canister
30 fuel supply pipe
31 upper end (fuel inlet)
33 lower end
40 separator
46 air vent
50 pipe member
51 breather passage
52 open end (opening)
53 end
55 end
80 sealing valve (valve)
S1 internal space
S2 breather chamber
V1, V2, V3, V4, W virtual line

What is claimed is:

1. A generator comprising a fuel tank that stores liquid fuel, wherein
the fuel tank includes a fuel inlet and a breather passage formed by a pipe member through which an inside and outside of the fuel tank communicate with each other,
the pipe member is provided with a valve that blocks the breather passage at normal time and opens the breather passage by a pressure of a predetermined value or higher,
a separator that forms a breather chamber isolated from an internal space of the fuel tank is provided inside the fuel tank,
one end of the pipe member is disposed inside the breather chamber, the fuel tank is provided with a cylindrical member that is coupled to the fuel inlet and extends toward the internal space of the fuel tank, the fuel inlet is provided on a top surface of the fuel tank, and the breather chamber is provided by being surrounded by the separator, the cylindrical member and the top surface of the fuel tank.

2. A generator comprising a fuel tank that stores liquid fuel, wherein the fuel tank includes a fuel inlet and a breather passage formed by a pipe member through which an inside and outside of the fuel tank communicate with each other, the pipe member is provided with a valve that blocks the breather passage at normal time and opens the breather passage by a pressure of a predetermined value or higher, a separator that forms a breather chamber isolated from an internal space of the fuel tank is provided inside the fuel tank, one end of the pipe member is disposed inside the breather chamber, the separator is provided with an air vent through which the internal space of the fuel tank and the breather chamber communicate with each other, an opening is provided on one end of the pipe member, and at least one of the air vent and the opening is provided on a part positioned above a liquid surface of the liquid fuel when the generator is turned over in a state where the fuel tank has the liquid fuel for half the amount of a capacity of the fuel tank.

3. The generator according to claim 2, wherein the fuel tank is provided with a cylindrical member that is coupled to the fuel inlet and extends toward the internal space of the fuel tank, the fuel inlet is provided on a top surface of the fuel tank, and the breather chamber is provided by being surrounded by the separator, the cylindrical member and the top surface of the fuel tank.

\* \* \* \* \*